(12) United States Patent
Luman et al.

(10) Patent No.: US 6,981,259 B2
(45) Date of Patent: Dec. 27, 2005

(54) SYSTEM AND METHOD FOR GENERATING A VIRTUAL DEVICE

(75) Inventors: David J. Luman, Meridian, ID (US); David W. Magnuson, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 792 days.

(21) Appl. No.: 09/921,110

(22) Filed: Aug. 2, 2001

(65) Prior Publication Data

US 2003/0037125 A1 Feb. 20, 2003

(51) Int. Cl.⁷ ............................................. G06F 9/46
(52) U.S. Cl. ........................... 718/103; 370/338
(58) Field of Search .... 455/41.2, 414.2; 718/103–104; 370/338

(56) References Cited

U.S. PATENT DOCUMENTS 6,230,004 B1 * 5/2001 Hall et al. ................ 455/414.2
6,748,195 B1 * 6/2004 Phillips ...................... 455/41.2

* cited by examiner

Primary Examiner—Mengal-Al T. An
Assistant Examiner—Camquy Truong

(57) ABSTRACT

A virtual device is created from a network of personal wireless devices so that they can query each other regarding the availability and sharing of resources. Each wireless device has a low power, limited range transceiver that enables it to communicate with other wireless devices similarly equipped. Once the network of wireless devices is formed, each wireless device stores a decision matrix that is made up of each wireless device's identification and the available resources within that device. A wireless device can then borrow those resources when an event occurs with that device that requires a resource that cannot be handled by the device.

19 Claims, 6 Drawing Sheets

SYSTEM AND METHOD FOR GENERATING A VIRTUAL DEVICE

BACKGROUND OF THE INVENTION

The present invention relates generally to networked electronic devices and systems and more particularly to a method for generating a virtual device comprising a network of electronic devices.

In order for an electronic device to be portable, manufacturers must make compromises in its design. Reducing the size and weight of a device are typically paramount. However, in order to reduce a device's size and weight, it's processing power and it's ability to display information typically suffers.

An example of a portable electronic device is the personal digital assistant (PDA). A PDA, such as PALM COMPUTING's PALM VX, can be thought of or considered to be an attempt at enabling a consumer to take the functional equivalent of a personal computer on the road. However, in order to be reasonably portable, the PDA, by necessity, has a small screen that limits display of content and a low power (low current-drain) processor that limits processing speed and capability.

In order to overcome the performance shortcomings of currently available portable electronic devices, a consumer may carry a number of devices that each performs a dedicated electronic function. For example, the consumer may carry a PDA to store thousands of telephone numbers since his cellular telephone is limited to only 100 telephone numbers. The consumer must then manually transfer the telephone information from the PDA to the telephone in order to dial the number. Or the stock market prices of equities or other investment information that the consumer receives on his Wireless Access Protocol-enabled cellular telephone may need a computer to calculate the capital gains taxes to which the consumer is exposed if he sells. This information must be manually entered into a PDA or computer in order for calculations to be performed. There is a resulting need for a dynamic distributed network that links personal electronic devices.

SUMMARY OF THE INVENTION

The present invention encompasses a process for creating a functionally enhanced virtual device from a wireless network of separate, functionally disparate electronic devices to provide a user with a much more functionally powerful device. The virtual device is expandable and upgradeable simply by purchasing a new electronic device that can participate in networked communications.

When a first wireless device is within the wireless communication range of a second wireless device or an already existing wireless network of devices, each wireless device determines if the other wireless device within range of each other has a sharable resource such as a display, communication device, memory, or any other apparatus that can be shared.

If the first wireless device has a sharable resource, the wireless devices form a wireless network with the first wireless device providing its sharable resource to other such devices. The sharable resource can thereafter be used by any of the other wireless devices in the network when an event occurs that requires the sharable resource ostensibly owned (or controlled) by the first device.

DETAILED DESCRIPTION OF THE PREFERRED EMBODIMENT

The system and processes of the present invention enable a plurality of individual electronic devices to establish with each other, through wireless technology, a virtual device comprised of a dynamic, distributed network. Each device incorporates a low power, high frequency radio frequency transceiver that enables the devices to communicate with each other when they are within a predetermined range of at least one other device. Once in range, the devices set up the network in order to distribute functional tasks amongst the various devices.

In the preferred embodiment, the Bluetooth specification is used for communication between electronic devices of the present invention. The Bluetooth specification calls for the use of low power (approximately 1 milliwatt) wireless transceivers operating at 2.45 GHz. This power level provides a maximum range of approximately 10 meters. Each electronic device in the Bluetooth standard receives a unique 48-bit address in order to differentiate the devices. Data transmission is typically in the range of 500 kbps to 2 Mbps, depending on the application.

Unlike infrared data transfer, the Bluetooth specifications enable it to operate through walls and briefcases. Infrared data transfer is line of sight only.

Alternate embodiments use other forms of wireless communication. For example, if the electronic devices are used only within line of sight, infrared communication can be used. In another embodiment, another low power wireless communication protocol is used. One example of such a communication standard is 802.11(b) that is well known in the art and is not discussed further.

The following discussion of the present invention refers to "resources" of the electronic devices that make up the distributed network. In the preferred embodiment, these resources are comprised of the various functional capabilities or functional aspects or parts of a device that would be desirous to share with other electronic devices. For example, a resource of a device may include a display (e.g., a color LCD, heads up displays on glasses, PDA display, camcorder display), a printer, a camcorder recording mechanism, memory, communication electronics (e.g., modem, network interface card, infrared transmitters, Ethernet interface), or even the processor cycles to assist a less capable resource in processing data. The present invention contemplates sharing via a wireless network any function or functional resource that is part of an electronic device and is sharable.

Figure 1:
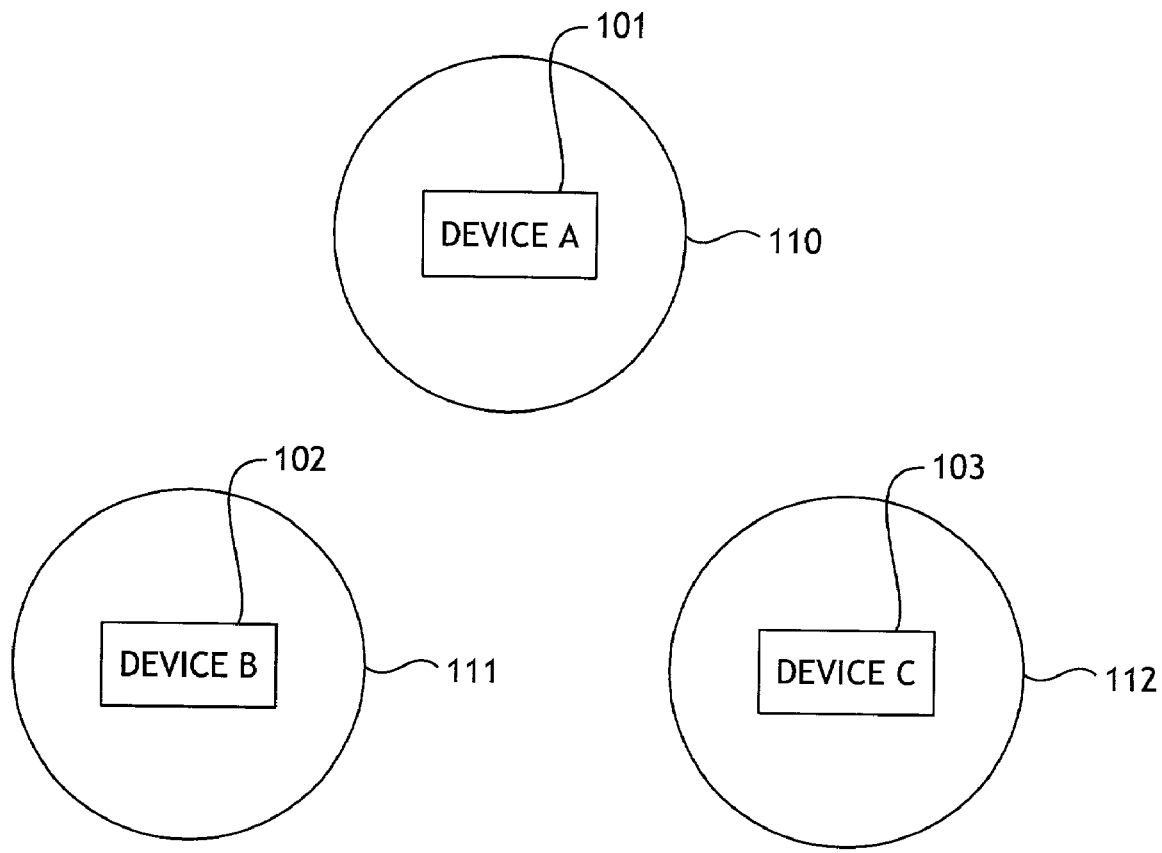
FIG. 1 shows a block diagram of a plurality of electronic devices that have not been networked in accordance with the present invention.

FIG. 1 illustrates a block diagram of a plurality of personal electronic devices (101–103) in accordance with the present invention. In the interest of clarity, only three such devices (101–103) are illustrated. However, alternate embodiments may incorporate an unlimited number of such devices.

The electronic devices (101–103) of the present invention may comprise any type of electronic device that incorporates a wireless communication capability that is compatible with other devices. For example, the electronic devices (101–103) may include PDAs, cellular telephones, cordless telephones, watches, pagers, computers, and printers as long as they are suitably equipped to wirelessly communicate with each other.

The segmented circles (110–112) around the electronic devices (101–103) of FIG. 1 illustrate only that the devices have a geographic communication limit or range. For purposes of illustration, the wireless ranges (110–112) are shown as circular and approximately equal to each other. In a real life situation, the wireless ranges will be of various shapes and sizes due to atmospheric conditions, power of the transceiver, battery power, and other disturbances.

FIG. 1 illustrates that the wireless ranges of the individual electronic devices are separated by a distance greater than the communication range of each transceiver. In this case, the electronic devices are not interacting with each other and the resources of each device are not available for use by the other devices.

Figure 2:
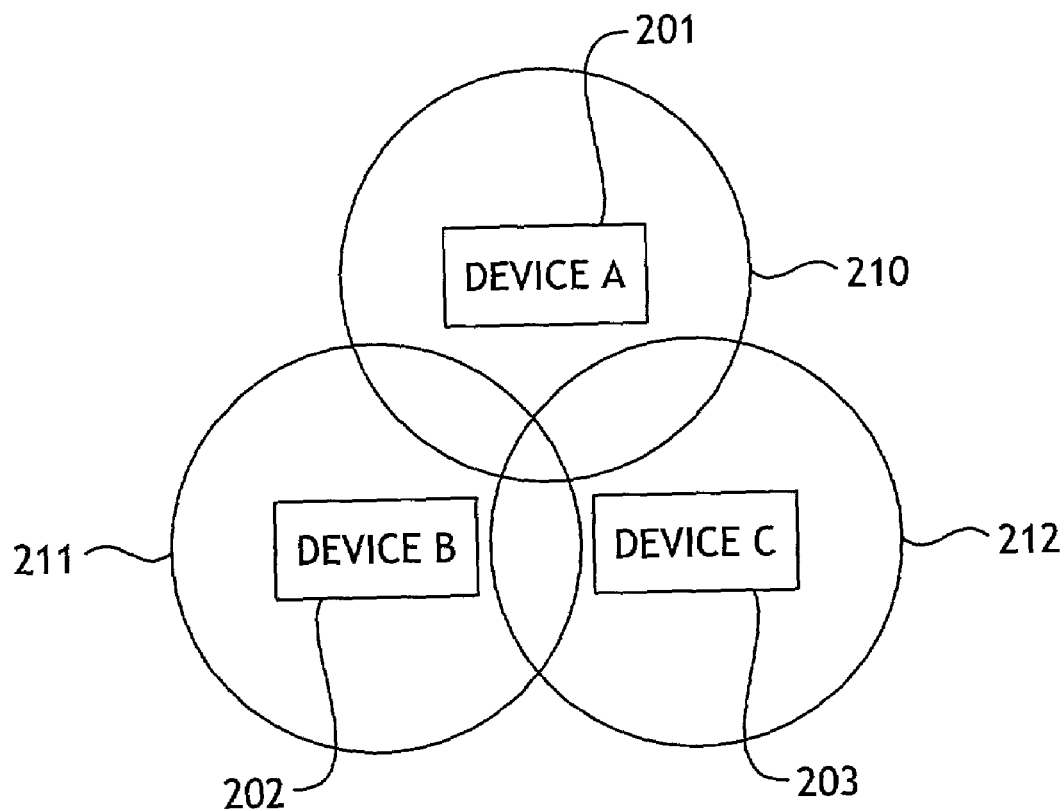
FIG. 2 shows a block diagram of a plurality of electronic devices that have established a virtual device in accordance with the present invention.

FIG. 2 illustrates an embodiment where the electronic devices (201–203) have come close enough that their communication ranges (210–212) have overlapped. In this case, the electronic devices can now communicate with each other and they have established links with their shared resources and the electronic devices can act as one virtual device in a distributed network. As described previously, the devices 201–203 can use the so-called Bluetooth wireless communication protocol to communicate with each other. Alternate embodiments would of course include other communication protocols as those skilled in the art will recognize. As described subsequently, a user of the network of individual devices (201–203) will perceive them as being a single, device more powerful than any of the individual devices.

In the embodiment of FIG. 2, device A (201) is communicating with both devices B (202) and C (203). Device B (202) is communicating with both devices A (201) and C (203). Similarly, device C is communicating with devices B (202) and A (201).

Figure 3:
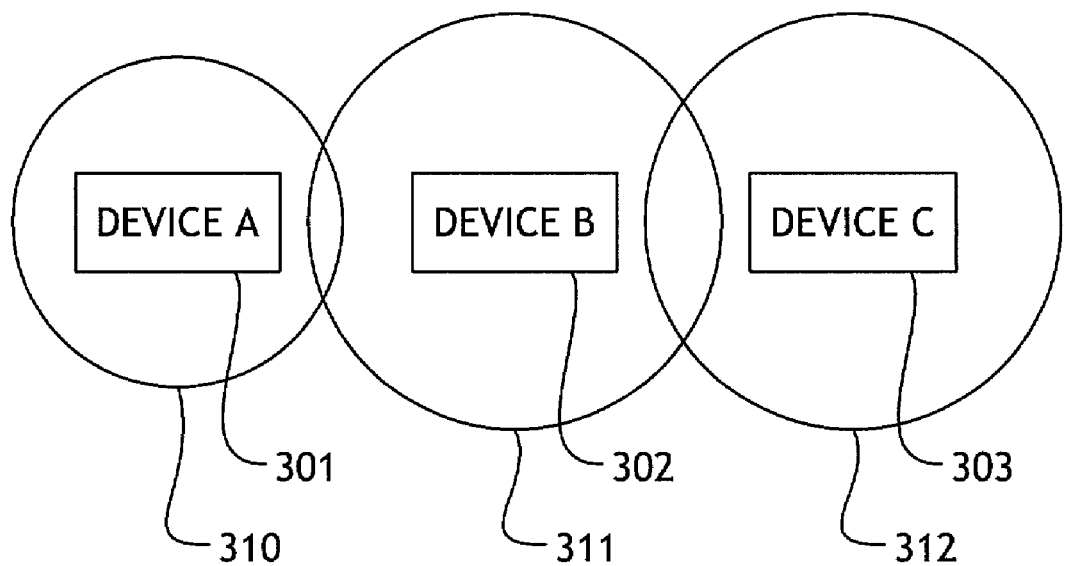
FIG. 3 shows a block diagram of a plurality of electronic devices in which one electronic device acts as a repeater in a distributed network.

FIG. 3 illustrates an embodiment where the transmit power of device A (301) is less than the other two devices (302 and 303). The transmit ranges (311 and 312) of devices B (302) and C (303) are approximately equal or at least greater than the transmit range (310) of device A (301). In this case, device A (301) uses device B (302) as a repeater to communicate with device C (303).

In the embodiment of FIG. 3, device C (303) can communicate with device B (302) but device C (303) cannot communicate directly with device A (301) due to the separation distance between device A and device C and the lack of transmit power of device A (301). Device B (302) either stores and forwards the information or acts as a frequency-shifting repeater, receiving information from device A (301), frequency shifting it and immediately re-transmitting that which is meant to reach device C (303) and vice versa.

Figure 4:
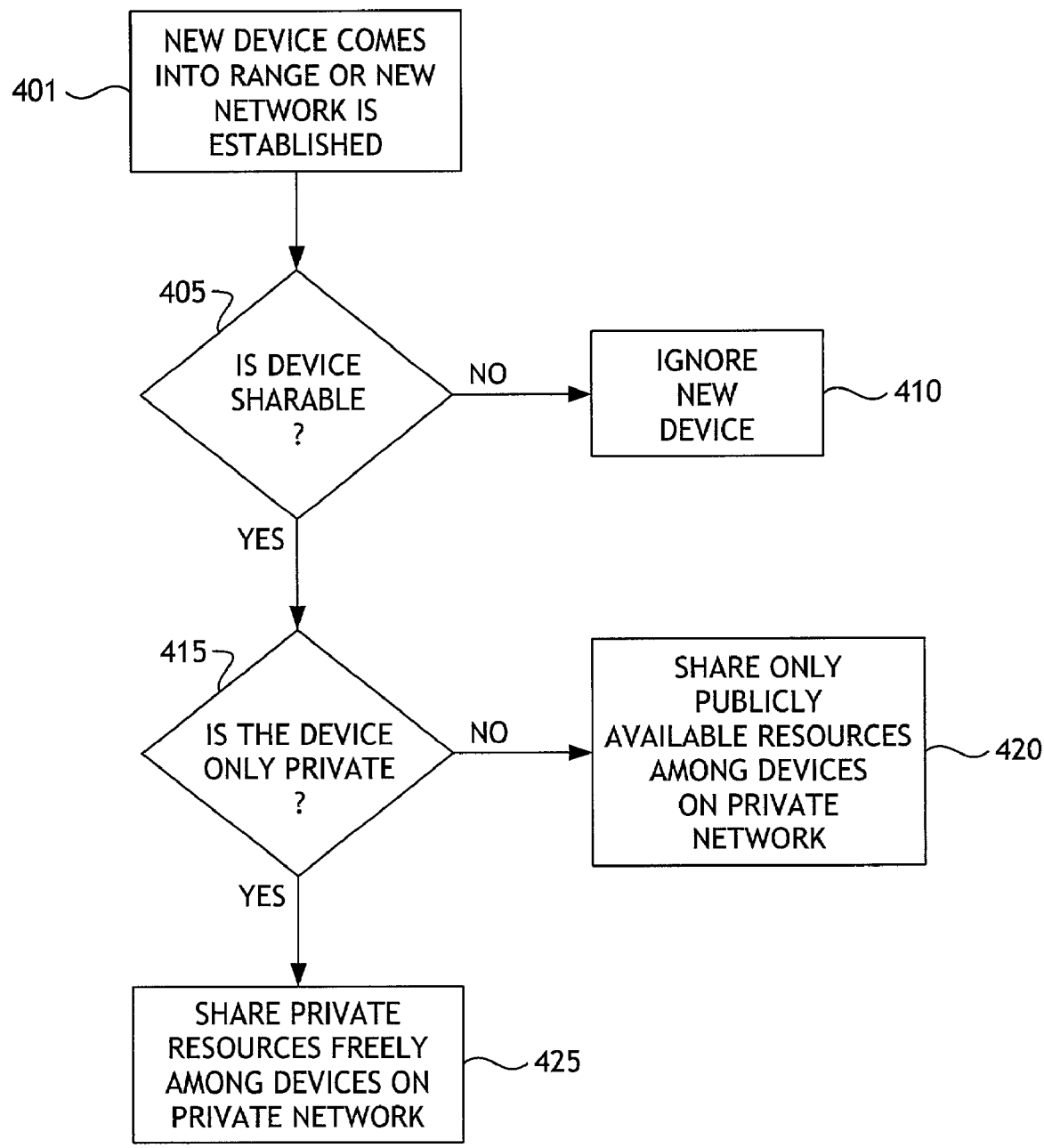
FIG. 4 shows a flowchart of a process for establishing a decision matrix in a virtual device of the present invention.

The for establishing a device matrix that permits the devices to act as one, through the distributed network, is illustrated in FIG. 4. The process begins when a new device comes into communication range of an existing network or a new network is established (step 401).

In this step (step 401), at least two, wireless networking-capable electronic devices have come close enough to communicate, as illustrated in FIGS. 2 and 3. In another embodiment, a distributed network already exists between at least two or more electronic devices and another electronic device comes close enough to communicate with at least one of the electronic devices that is part of the existing network.

When the new device is detected (by its own spontaneous transmissions or by polling messages sent from one or more networked devices) or the two devices are close enough to detect each other, the sharability of the device is identified (step 405). An electronic device may be capable of wireless communication and/or Bluetooth compliant (or some other wireless standard) but not have the resources or networking software to join in or form a wireless, distributed network. In this case, the device is ignored (step 410).

If a device is capable of joining an existing network or is capable of forming a distributed network with other devices, (step 405), it is next determined if the device trying to join a network is only a "private" device (step 415). In this case, the device may be trying to join a "private" network that is established between an individual's resources. For example, the private network shown in FIG. 2 may be comprised of resources such as an individual's watch, a PDA, and a global positioning satellite (GPS) receiver. This step determines if the device trying to join the individual's private network is one of the individual's private devices or a device that is not privately owned and operated by the individual.

If the individual does not own the device and, therefore, does not want it to be part of the individual's private network, only the publicly available resources of the device, if any, are shared amongst the devices of the private network (step 420). The owner of the device, who agrees to have his device be part of a network of compatible devices, sets up the public and private resources of each device during a customization routine. If the device is private only (step 425), the owner will likely want to share the resources among wireless devices on his private network.

At this point, a distributed network and decision matrix have been formed between the electronic devices. All of the devices have shared their identities (e.g., Bluetooth address, IP address) and their shareable resources and capabilities with the other device(s) of the distributed network. The decision matrix is comprised of a task-prioritized list of currently available resources and the address of the associated electronic device that has those resources. In the preferred embodiment, each electronic device stores its own copy of the decision matrix.

In an alternate embodiment, a master device is identified by the network devices based on the capabilities of the master device. The master device then maintains the decision matrix for all the other "slave" devices.

Figure 5:
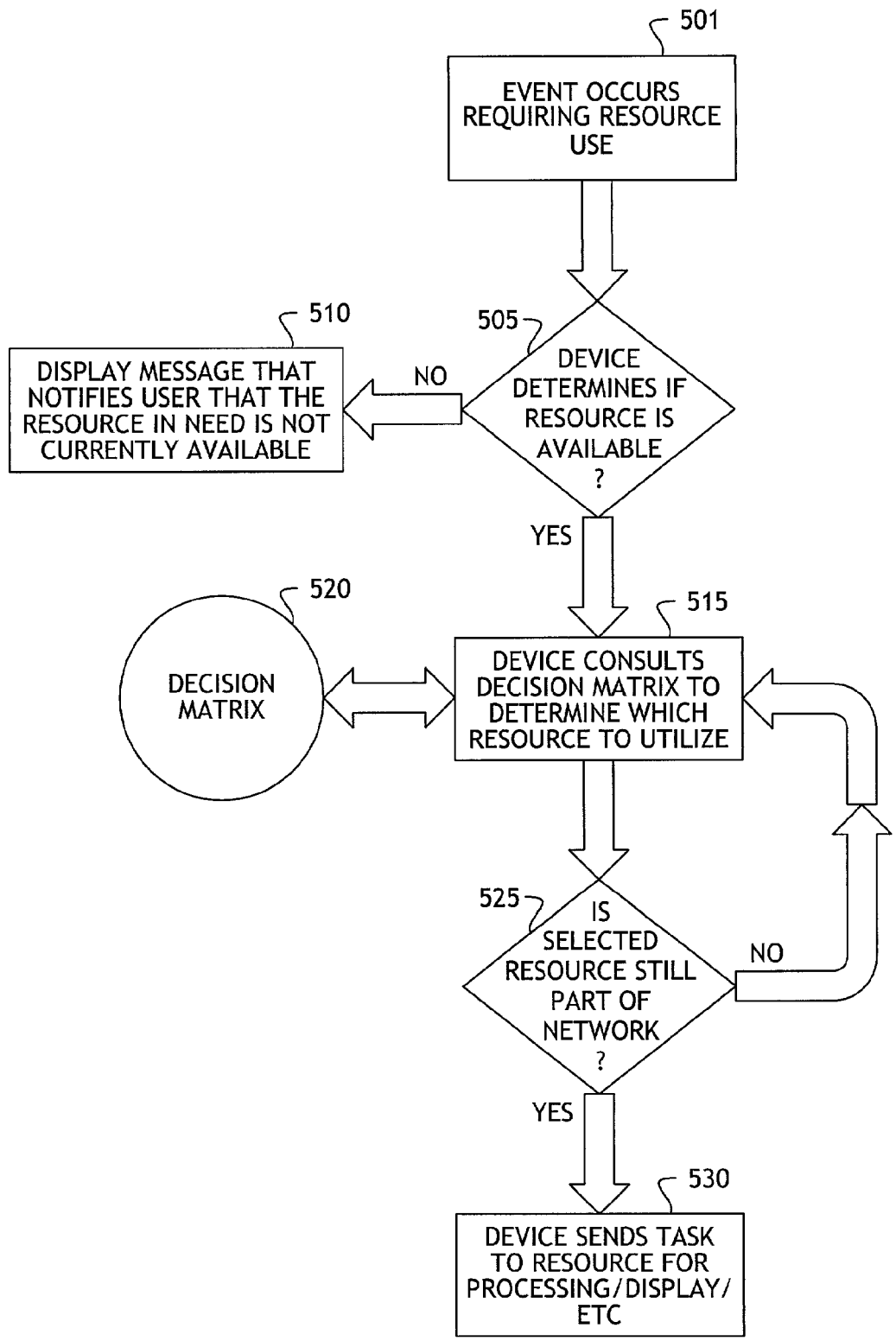
FIG. 5 shows a flowchart of a process for the sharing of resources in a virtual device of the present invention.

FIG. 5 illustrates a flowchart of a process for resource sharing among the electronic devices of the distributed network. The process starts when an event occurs that requires resource use (step 501). An example of such an event includes one device of the network requiring the use of a display on another device of the network.

The device requiring the resource must determine if the required resource is available (step 505) from one of the other devices of the network. Determining if a resource is available can be accomplished in a number of ways.

One or more of the networked devices can maintain a list of the network devices (as network elements) and maintain a list of the particular resources that each networked device has available. In an alternate embodiment, a particular network device requiring a resource can poll the other networked devices to determine from each, what sort of resources each has.

In yet another embodiment, the device requiring a resource can broadcast a resource request message to all of the networked devices on the network, the structure, contents or format of which is understood by devices on the network to be an inquiry from one device for the availability of a particular resource that might be available from other devices. In yet another embodiment, certain types of resources can be assigned certain types of address. For instance, network display devices can be assigned to have a certain value or values of Ethernet-like addresses while two-way radios or printers have other addresses. When a particular capability is required by a requesting device it needs only to address the particular type of device using the device-type address. If the resource is not available, as determined by either a negative response or no response to a poll or broadcast inquiry or because of an absence of a list entry, a message is displayed on the requesting device to notify the user that the resource is not currently available (step 510). In an alternate embodiment, an alert tone is broadcast to indicate the error condition.

If the resource is available (step 515), the device requiring the resource (the "requesting device") consults its decision matrix (step 520) to determine which resource to utilize. The decision matrix (step 520) informs the requesting device of the address and resource(s) available at that address or at other addresses on the network.

The requesting device then transmits the request for the resource to the specified address to determine if the device having the resource (the "sharing device") is still part of the network (step 525) and if the shared resource is available to be shared, (i.e., is not busy). If the sharing device (with the required resource) is not part of the network anymore, the decision matrix (step 520) is checked for any other (i.e., additional) identical or similarly capable resources that are available to take the place of the missing resource. In some cases, the decision matrix may have to settle for a resource that does not have the desired capabilities but is capable enough to handle the task. By way of example, if a color display device is requested by one device, but another device has a monochromatic device available, the monochromatic display can be selected to perform the requested function. In other cases, such as when a graphics file is received and no wireless device has graphics capability; the file may be placed in a queue for later viewing when the required resource has joined the network, or the graphics file can be sent to a printer for printing. The decision as to whether to opt for a substitute device can be user-determined or device-determined by the network-service software.

If the sharing device (with the required resource) is part of the network, the requesting device (requiring the resource) sends the task to the resource for processing or display (step 530). This step is comprised of the requesting device formatting the task, such as a line of text to display, into a data packet (e.g., a header with sending and receiving addresses, message text and formatting data) for wireless transmission to the device having the resource.

Figure 6:
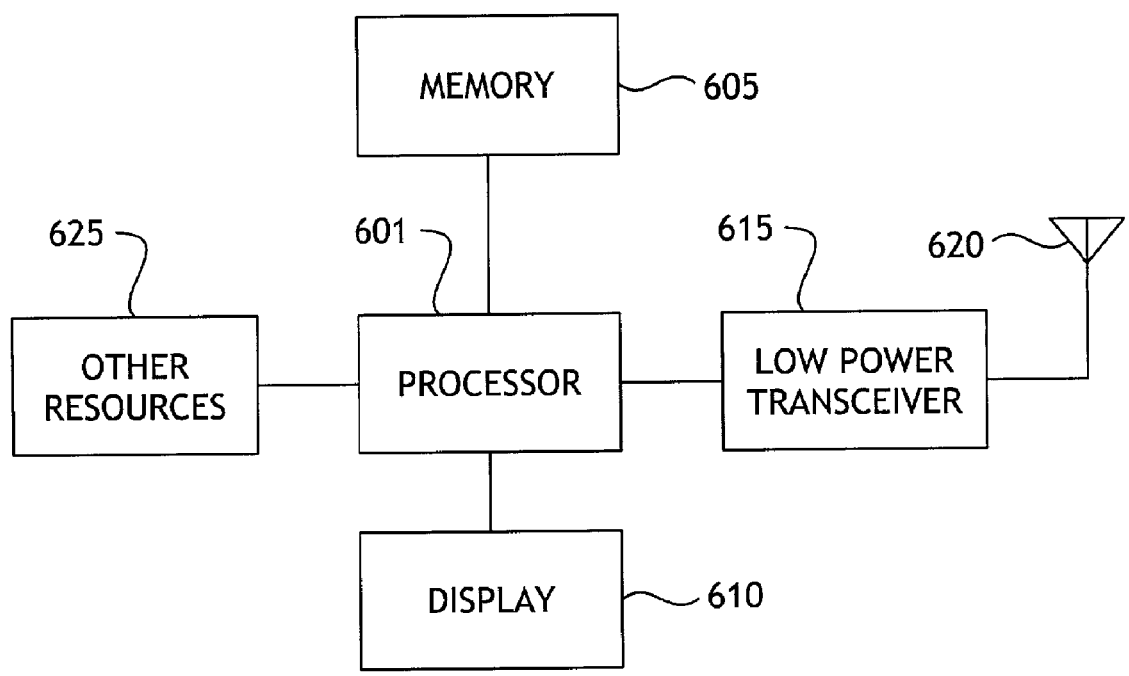
FIG. 6 shows a block diagram of a typical wireless electronic device in accordance with the present invention.

FIG. 6 illustrates a block diagram of a typical wireless device of the present invention. This device is comprised of a microcontroller or processor (601) that controls the operation of the device. Memory (605) is used to store data that is used by the processor (601). This data includes the operating system of the device and any programs or processes used by the device.

The memory (605) includes any type of memory necessary for operation of the device. The memory (605) can include random access memory (RAM), read only memory (ROM), electrically erasable programmable ROM (EEPROM). The memory can also include fixed or removable storage media such as floppy drives, PCMCIA cards, hard disk drives, or any other storage media.

A display (610) may be used to display data generated by the processor (601) such as graphics, text, telephone numbers, video, or any other data requiring a display.

A low power transceiver (615) is used to communicate with the other wireless devices of the network. The transceiver (615), to be compliant with the Bluetooth standard, operates at approximately 1 milliwatt. The present invention, however, encompasses other power outputs. An antenna (620) is coupled to the transceiver (615) to radiate and receive signals from the other wireless devices.

Other resources (625) may be included in the wireless device of the present invention. These resources may be modular such that they can be added and taken away by simply sliding in a cartridge or other type of module. For example, if the wireless device is a PDA, the user may want to add a GPS receiver to the device. In this case, the GPS receiver would then become part of the device's resources.

The wireless device of FIG. 6 is only one embodiment of a wireless device of the present invention. Other devices may incorporate other functions and thus require additional circuitry. Still other embodiments may have less functionality and therefore require less circuitry than illustrated in FIG. 6. Inasmuch as the network disclosed herein is a wireless network, each of the devices thereof must be separately identifiable from the others, each of which will "hear" network transmissions. Accordingly, the data transmission protocol used between the devices contemplates an Ethernet-like protocol whereby the identities of senders and receivers of data packets are identified in each packet in a header appended to the message data that originates at one machine to be sent to another.

By way of example, a large text file in a PDA that needs to be "attached" to an e-mail message from the PDA, which itself needs to be wirelessly transmitted from a two-way radio, will need to be sent from the PDA to the radio. The e-mail and the attachment file can be formatted into several Ethernet packets, each of which identifies the logical address of the PDA as the source and identifies the logical address of the radio as the destination. Other devices such as PDAs, cellular telephones, pagers, watches, printers, personal computers, etc., which "hear" such information on a radio broadcast will ignore them after they are at least partially decoded (to determine at least the intended recipient's address) as the messages are not addressed to them. An Ethernet or Ethernet-like method of addressing data packets can enable disparate devices on a wireless network to coherently transfer information between one or more others on the network.

A user that has a digital watch, a cellular telephone, and a PDA illustrates an example of the operation of the distributed network of the present invention. Each of these electronic devices is a wireless-capable device in accordance with the present invention.

The user has all three devices in close proximity and they have established a network and their respective decision matrices as discussed previously (i.e., determined which device is best for each event). The user makes a call back to a client using the cellular telephone. The cellular telephone uses the larger telephone directory that is available from the PDA. The user requests that the client transmit a file, comprising color graphics, back to the user.

The user receives the color file on the cellular telephone. The cellular telephone redirects the file to the PDA because, after consulting the decision matrix, the telephone determined that the PDA has the capability to display the color graphics better than the cellular telephone.

The user then receives a call and knows to check his watch for the caller ID information that is transmitted from the telephone to the watch. The watch displays the telephone number because the user has specified an exception to the decision matrix that overrides the "best" display device determination for caller ID information. Therefore, instead of the cellular telephone displaying the caller ID information, since the telephone may be in the user's pocket or briefcase, the information is transmitted from the telephone to the user's watch for display.

In another embodiment, the previous scenario is performed. However, when the telephone call is received, the caller ID information is transmitted to every display in the network. This allows the user to read any display that is more accessible.

In yet another embodiment, the user redirects the telephone output to a set of portable, wireless headphones. In this embodiment, the user may be listening to music from a CD or MP3 player when the telephone call is received. Instead of having to remove the headphones, the telephone interrupts the music with the audio portion of the telephone call and displays the telephone number on the CD or MP3 player display.

Still another example of the present invention is enabling a personal wireless device that is being used by an individual to access a public information database. For example, the individual may have landed in an airport and does not have a telephone number for a local taxicab company. The individual walks close to a kiosk that is comprised of a low power transceiver, substantially similar to the one in the wireless device, in order to access the database from the kiosk.

In this example, the kiosk may be linked to the Internet or have the database stored internally on a server. The kiosk may also be a dedicated telephone number directory or also give the individual the ability to select from a listing of available information to transfer to the personal wireless device.

Once the information is transferred, the other personal wireless devices being used by the individual, such as his watch, PDA, or cellular telephone, may share the transferred information. For example, if the PDA was used to download the telephone number and map of the area, the PDA shares the telephone number with the cellular telephone while displaying the map on the PDA's display.

Various formats of the signals that are transmitted between the personal wireless devices of the present invention can be used. For example, the digital data that is transmitted between the devices may be packetized such that the data is broken up into a predetermined size packet (e.g., ATM-like packets) including headers and error correction, before transmission to another device. These various formats of data transmission are well known in the art and the present invention is not limited to any one format.

In summary, the networks and processes of the present invention enable wireless electronic devices to seamlessly interact and share resources amongst themselves. The network forms and shares the resources of each device electronic devices such that the distributed network can then act as one extended device without manual intervention by the user. This provides the user with a much more powerful virtual device that is expandable and upgradeable simply by purchasing one new electronic device.

Numerous modifications and variations of the present invention are possible in light of the above teachings. It is therefore to be understood that within the scope of the appended claims, the invention may be practiced otherwise than as specifically described herein.

What is claimed is:

1. A method for generating a virtual device comprising a plurality of wireless devices, each wireless device comprising a limited range communications apparatus, the method comprising the steps of:
    when a first wireless device is within the limited range of a second wireless device, each wireless device determining if the other wireless device comprises a sharable resource;
    if at least one of the first or second wireless devices comprises a sharable resource, the first and second wireless devices forming a wireless network such that the sharable resource is used by the other wireless device when an event requiring the sharable resource is received by the wireless network;
    after the wireless network is formed, storing within each wireless device a decision matrix that permits the wireless devices to act as one, through a distributed network, the decision matrix comprising identification of each wireless device and available resources within the devices to automatically enable one of the wireless devices to borrow available resources of another wireless device of the network when an event occurs on a particular device that the particular device cannot handle with the particular device's own resources;
    wherein the decision matrix is comprised of a task-prioritized list of currently available resources and address of associated electronic devices that have available resources;
    the first wireless device storing information comprising identification information regarding the second wireless device and information regarding the sharable resource; and
    the second wireless device storing information comprising identification information regarding the first wireless device and information regarding the sharable resource.

2. The method of claim 1 wherein the sharable resources comprise at least one of: a display, a modem, a global positioning satellite receiver, processing time, and memory.

3. The method of claim 1 wherein the identification information comprises unique identification assigned to each wireless device.

4. A method for sharing resources comprising a plurality of wireless devices, each wireless device comprising a unique device identification and a limited range communications apparatus, the method comprising the steps of:
    when a first wireless device is within the range of a wireless, distributed network comprising the plurality of wireless devices, determining if the first wireless device comprises a sharable resource;
    if the first wireless device comprises a sharable resource, the wireless distributed network enabling the first wireless device to join the wireless distributed network such that the sharable resource is used by the plurality of wireless devices when an event requiring the sharable resource is received by the wireless distributed network;

after the distributed network is formed, storing within each wireless device a decision matrix that permits the wireless devices to act as one, through a distributed network, the decision matrix comprising the unique identification of each wireless device and available resources within the devices to automatically enable one of the wireless devices to borrow available resources of another wireless device of the network when an event occurs on a particular device that the particular device cannot handle with the particular device's own resources;

wherein the decision matrix is comprised of a task-prioritized list of currently available resources and address of associated electronic devices that have available resources;

the first wireless device storing information comprising identification information regarding the second wireless device and information regarding the sharable resource; and the second wireless device storing information comprising identification information regarding the first wireless device and information regarding the sharable resource.

5. The method of claim 4 wherein the unique device identification comprises Bluetooth-compliant identification information.

6. The method of claim 4 and further including the step of determining if the first wireless device is a private device.

7. A method for sharing resources among a plurality of wireless devices belonging to a wireless network, the method comprising the steps of:

generating a decision matrix comprising an identification of each of the plurality of wireless devices and their corresponding shared resource that permits the wireless devices to act as one, through a distributed network, the decision matrix;

creating within the decision matrix a task-prioritized list of currently available resources and address of associated electronic devices that have available resources;

a first wireless device of the plurality of wireless devices generating an event that requires a shared resource; consulting the decision matrix to determine which shared resource to utilize;

the first wireless device determining if the shared resource is available;

if the shared resource is not available, indicating the unavailability of the shared resource;

if the shared resource is available, automatically enabling one of the wireless devices to borrow the available resources when an event occurs on a particular device that the particular device cannot handle with the particular device's own resources;

the first wireless device storing information comprising identification information regarding the second wireless device and information regarding the sharable resource; and the second wireless device storing information comprising identification information regarding the first wireless device and information regarding the sharable resource.

8. The method of claim 7 wherein the resources comprise at least one of a display, a communication device, and processing time.

9. The method of claim 7 wherein the step of the first wireless device generating the event comprises the first wireless device receiving a file for display utilizing the shared resource of the wireless device having the resource.

10. The method of claim 7 and further including the step of if the shared resource is not available, updating the decision matrix to indicate the unavailability of the shared resource.

11. A personal wireless device comprising:

at least one apparatus for executing a task;

a communication apparatus for wireless communication having a limited communication range with other personal wireless devices in a wireless network;

a decision matrix that permits the wireless devices to act as one, through a distributed network, the decision matrix comprising a list of personal wireless devices of which the wireless network is comprised and a list of any shared resources corresponding to each personal wireless device and configured to automatically enable one of the wireless devices to borrow available resources when an event occurs on a particular device that the particular device cannot handle with the particular device's own resources;

wherein the decision matrix is comprised of a task-prioritized list of currently available resources and address of associated electronic devices that have available resources;

the first wireless device storing information comprising identification information regarding the second wireless device and information regarding the sharable resource; and the second wireless device storing information comprising identification information regarding the first wireless device and information regarding the sharable resource.

12. The device of claim 11 wherein the communication apparatus is in compliance with a Bluetooth specification.

13. The device of claim 12 wherein the communication apparatus is in compliance with the Bluetooth specification.

14. A method for transferring information between a personal wireless device that comprises a first limited range communications apparatus and a public information database coupled to a second limited range communications apparatus, the method comprising the steps of:

placing the personal wireless device within the limited range of the second communications apparatus;

the personal wireless device and the public information database forming a network;

after the wireless network is formed, storing within each wireless device a decision matrix that permits the wireless devices to act as one, through a distributed network, the decision matrix comprising identification of each wireless device and available resources within the devices to automatically enable one of the wireless devices to borrow available resources of another wireless device of the network when an event occurs on a particular device that the particular device cannot handle with the particular device's own resources;

wherein the decision matrix is comprised of a task-prioritized list of currently available resources and address of associated electronic devices that have available resources;

the personal wireless device requesting an information transfer from the public information database;

the public information database transferring the requested information to the personal wireless devices;

the first wireless device storing information comprising identification information regarding the second wireless device and information regarding the sharable resource; and the second wireless device storing information comprising identification information regarding the first wireless device and information regarding the sharable resource.

15. The method of claim 14 and further including the step of the personal wireless device forming a network with other personal wireless devices in order to share the transferred information.

16. The method of claim 15 wherein the public information database comprises a local public telephone directory and the transferred information comprises a local telephone number.

17. A method for generating a virtual device comprising a plurality of wireless devices, the plurality of wireless devices having a master wireless device and each device comprising identification information and a limited range communication apparatus, the method comprising the steps of:

when a first wireless device of the plurality of wireless devices is within the limited range of the master wireless device, the master wireless device determining if the first wireless device comprises a sharable resource;

if the first wireless device comprises a sharable resource, the first and master wireless devices forming a wireless network such that the sharable resource and any master wireless device sharable resource is used by the other wireless device when an event requiring the sharable resource is received by the wireless network;

the master wireless device saving the identification information and shared resource information regarding the first wireless device of the wireless in a decision matrix;

after the wireless network is formed, using the decision matrix to automatically enable one of the wireless devices to borrow available resources of another wireless device of the network when an event occurs on a particular device that the particular device cannot handle with the particular device's own resources; and wherein the decision matrix permits the wireless devices to act as one, through a distributed network, and wherein the decision matrix is comprised of a task-prioritized list of currently available resources and address of associated electronic devices that have available resources;

the first wireless device storing information comprising identification information regarding the second wireless device and information regarding the sharable resource; and the second wireless device storing information comprising identification information regarding the first wireless device and information regarding the sharable resource.

18. The method of claim 17 and further comprising the step of the master wireless device saving a decision matrix that comprises a row of each of the identification information for each of the plurality of wireless devices, a column for each available shared resource, and an indication of which identification information is comprised of which shared resource.

19. A method for generating a virtual device comprising a plurality of wireless devices, each wireless device comprising a limited range communication apparatus, the method comprising the steps of:

when a first wireless device is within range of a second wireless device, each wireless device determining if the other wireless device comprises a sharable resource;

if at least one of the first or second wireless devices comprises a sharable resource, the first and second wireless devices forming a wireless network such that the sharable resource is used by the other wireless device when an event requiring the sharable resource is received by the wireless network;

each of the plurality of wireless devices that comprise the wireless network storing identification and shared resource information regarding the other wireless devices of the wireless distributed network in a decision matrix that permits the wireless devices to act as one, through a distributed network, the decision matrix, wherein the decision matrix is comprised of a task-prioritized list of currently available resources and address of associated electronic devices that have available resources;

after the wireless network is formed, using the decision matrix to automatically enable one of the wireless devices to borrow the available resources of another wireless device of the network when an event occurs on a particular device that the particular device cannot handle with the particular device's own resources;

the second wireless device acting as a repeater for the first wireless device such that the first wireless device communicates with the other plurality of wireless devices through the second wireless device;

the first wireless device storing information comprising identification information regarding the second wireless device and information regarding the sharable resource; and the second wireless device storing information comprising identification information regarding the first wireless device and information regarding the sharable resource.

* * * * *